(12) United States Patent
Pagani et al.

(10) Patent No.: US 8,829,931 B2
(45) Date of Patent: Sep. 9, 2014

(54) TESTING METHOD FOR SEMICONDUCTOR INTEGRATED ELECTRONIC DEVICES AND CORRESPONDING TEST ARCHITECTURE

(75) Inventors: Alberto Pagani, Nova Milanese (IT); Jean-Michel Bard, Grenoble Cedex (FR)

(73) Assignees: STMircoelectronics (Grenoble 2) SAS, Grenoble (FR); STMircoelectronics S.r.l., Agrate Brianza (IT)

( * ) Notice: Subject to any disclaimer, the term of this patent is extended or adjusted under 35 U.S.C. 154(b) by 203 days.

(21) Appl. No.: 13/252,895

(22) Filed: Oct. 4, 2011

(65) Prior Publication Data

US 2012/0081137 A1 Apr. 5, 2012

(30) Foreign Application Priority Data

Oct. 5, 2010 (FR) ...................................... 10 58043

(51) Int. Cl.
*G01R 31/00* (2006.01)
*G06F 11/26* (2006.01)

(52) U.S. Cl.
CPC ...................................... *G06F 11/26* (2013.01)
USPC .................. 324/750.01; 324/537; 324/763.01

(58) Field of Classification Search
CPC .................................................. G06F 11/2733
USPC .................. 324/750.01, 537, 763.01
See application file for complete search history.

(56) References Cited

U.S. PATENT DOCUMENTS

| | | | | |
|---|---|---|---|---|
| 5,968,149 | A | * | 10/1999 | Jaquette et al. ................... 710/68 |
| 7,449,909 | B2 | * | 11/2008 | Ma et al. ..................... 324/750.3 |
| 8,643,513 | B2 | * | 2/2014 | Fallon .............................. 341/51 |
| 2004/0181724 | A1 | | 9/2004 | McBride |
| 2005/0193294 | A1 | | 9/2005 | Hildebrant |
| 2007/0096759 | A1 | * | 5/2007 | Weinraub ....................... 324/763 |
| 2007/0216438 | A1 | * | 9/2007 | Gupta et al. ................... 324/765 |
| 2009/0079448 | A1 | * | 3/2009 | Berry ............................ 324/754 |
| 2010/0134133 | A1 | * | 6/2010 | Pagani ........................... 324/763 |

* cited by examiner

*Primary Examiner* — Huy Q Phan
*Assistant Examiner* — Giovanni Astacio-Oquendo
(74) *Attorney, Agent, or Firm* — Seed IP Law Group PLLC

(57) ABSTRACT

A testing method is described of at least one device provided with an integrated testing circuit and in communication with at least one tester where messages/instructions/test signals/information are exclusively sent from the tester to the device. A testing architecture is also described for implementing this testing method.

17 Claims, 13 Drawing Sheets

TESTING METHOD FOR SEMICONDUCTOR INTEGRATED ELECTRONIC DEVICES AND CORRESPONDING TEST ARCHITECTURE

BACKGROUND

1. Technical Field

The present disclosure relates to a testing method for semiconductor integrated electronic devices.

More specifically the disclosure relates to a testing method for at least one device DUT provided with an integrated testing circuit and connected to at least one tester ATE.

The disclosure also relates to a testing architecture for implementing this testing method.

The disclosure particularly, but not exclusively, relates to the testing methods for the processes of electric selection of the wafers and the following description is made with reference to this field of application by way of illustration only.

2. Description of the Related Art

As it is well known, the process of electric selection of devices executed on wafers, i.e., the so called testing EWS (acronym of "Electrical-Wafer-Sorting"), involves electrically connecting a tester or ATE (acronym of "Automatic Test Equipment") which executed measurements on a wafer whereon electronic components are present to be verified or selected or tested, in particular chips, generically indicated as devices DUT (acronym of "Device Under Test"). A portion of a testing system is schematically shown in FIG. 1, globally indicated with 1.

The interface between a real tester ATE 2 and a wafer 8 comprising a plurality of devices to be tested or selected, in particular chips (also indicated as integrated circuits or IC, acronym of "Integrated Circuit") is a so called probe card 4, which is a board substantially made of a PCB (acronym of "Printed Circuit Board") and of a probe head 5 which comprises different hundreds (often thousands) of probes 6 which electrically connect the tester ATE 2 with almost all the contact pads 7 of a device DUT to be tested.

Moreover, an interface or testing board 3 can be interposed, as in the case shown in FIG. 1, between the tester ATE 2 and the probe card 4. In particular, the testing board 3 usually comprises additional circuits for the testing of the at least one device DUT.

In general, the wafer 8 groups a plurality of devices DUT to be tested, and during the testing steps it is placed on a support called chuck 9, shown in the portion of the testing system 1, and belonging to an apparatus called prober (not shown in the figure), this support being then also indicated as prober chuck.

The number of pads 7 for a determined testing can be lower than or identical to the total number of pads present on the device DUT to be tested.

The process goes ahead in a similar way even if on the devices DUT or chips contact bumps (or projecting protuberances) are present instead of pads, as it is well known to the skilled in the art.

In particular, all the pads 7 of the device or of the devices DUT (in the more and more frequent case of parallel testing of more devices simultaneously), for the testing are to be connected to the ATE, but generally almost all the pads present on the device/devices DUT are used as schematically shown in FIG. 2.

Before each chip is encapsulated in a relative package, the testing of the chip itself still on the wafer 8 is then executed, by using the probes 6 that are directly connected to the pads 7 of the chip and that thus execute the so called probing of the pads 7 they come in contact with.

After the testing, the wafer 8 is cut and the chips to be proved to be in working order are assembled in their package, ready for further process steps, also comprising final testing steps in the package wherein they have been assembled.

In a way similar to the testing on wafer, the tester ATE is in particular able to executed a final test or FT (acronym of "Final Test") of what is contained in the package comprising a given chip, electrically contacting the connections of the same package itself.

In the case of systems SiP (acronym of "System In Package") other situations may occur, even very complex, further to the creation of electric connections between the various parts (chips, passive components, PCB, . . . ) of the system, these situations being known to the technicians of the field and in particular to the testing experts.

Such a testing apparatus can be used also for the test WLBI (Wafer Level Burn-In) i.e., electric testing which is executed on the chips of the tests (also at high temperature) stress being present.

The process goes ahead in a similar way also for a generic electronic system, however complex, where this system is connected to the ATE that tests its functionalities, and the ATE connects itself to the resources of the system, and these connections are made available by the system through pads (for the chips on wafer), bumps (for the chips on wafer or encapsulated in a package) or more in general with suitable connectors, that will be hereafter in any case called resources.

It is also known that for the testing of the digital part of the DUT or digital circuit it is convenient to use scanning techniques, based on scan chain and ATPG (acronym of "Advanced Test Pattern Generator"). In particular, considering a generic logic network with combinatorial and sequential elements, the scan chains are created by replacing the flip flops FF of this logic network with scan flip flops FF at whose input a suitable circuit is placed which in general is a multiplexer able to create the scan chains desired when the testing step of the digital circuit is being executed. This testing step is generally called test mode, for distinguishing it from the normal operation of the circuit, indicated indifferently as user mode, normal mode or normal.

A control signal is used for switching the device DUT from the user mode configuration to the test mode configuration, so that in the digital circuit the generic scan chain is created which is, in practice, a shift register that groups at least one part of the memory elements (flip flops) of the digital circuit of the device DUT.

More in particular, the test scan chains of the digital circuit of the device DUT in test mode configuration are pre-charged with suitable values and for testing the correct operation of the digital circuit itself. These values are indifferently called testing vectors, scan vectors or test vectors.

Thanks to this, the number of combinations the input signals have to take in order to demonstrate the correct functionality of the digital circuit itself is significantly reduced, verifying for each input combination, that the value of the outputs is correct.

In practice, the scan chains are pre-charged with the test vectors, that are then applied to a combinatorial network which is connected to the outputs of the various flip-flops of the scan chains themselves. During the application of the test vectors to the combinatorial network also the main input values or stimuli PI (acronym of: "Primary Inputs") of the digital circuit are set.

Against these stimuli PI, and the test vectors pre-charged in the scan chains, the outputs of the combinatorial network and the memory elements (flip flops) of the scan chains will take a certain value, indicated also as signatures.

The output signatures are then discharged by the scan chains and also the output values PO (acronym of: "Primary Outputs") are read, which are then compared with the ATE 2 with the awaited values so as to demonstrate the correct functionality of the digital circuit.

In substance, it is the tester ATE 2 that always supplies at the input of the digital circuit of the DUT and charges the test vectors and also discharges the output signatures and analyses them. At present, between the tester ATE and the at least one device DUT there exists a bidirectional exchange of information through signals that go from the ATE 2 to the device DUT and vice versa.

The number of flip flops present in the scan chains and the number of scan chains obviously determines the time for charging the test vectors and discharging the output signatures.

In consequence, if the scan chains are little deep (i.e., they comprise a limited number of flip flops) the test time is reduced. In any case, it is to be taken into account that the testers ATE have a limited number of digital channels or resources to which the scan chains can be connected, and this number of resources determines the number of scan chains that can be created in the digital circuit.

It is then known to use techniques of compression or scan compression for reducing the depth of the scan chains, increasing at the same time the number of scan chains themselves.

For executing the testing through scan compression two suitable circuits are placed at the input and at the output of the scan chains, the first circuit executing the decompression of the test vectors at the input of the scan chains, and the second circuit executing the compression of the output signatures of the scan chains.

In consequence the ATE 2 supplies at the input the compressed test vectors and collects at the output the compressed output signatures.

Thanks to the scan compression a compression factor equal to ten or higher is obtained according to the particular circuit considered.

The test vectors and the output signatures are usually generated by a suitable software tool called ATPG (acronym of "Advanced Test Pattern Generator"), that, in its upgraded versions, supplies also the compressed test vectors and output signatures.

The compression of the output signatures can also be replaced with their compaction. For example for the compaction of the signature a MISR (Multiple Input Shift Register) can be used.

The compression differs from the compaction in that with the compression there is no loss of information (and thus the original response of the digital circuit in question can be reconstructed), while with the compaction there is loss of information (and thus the original response of the circuit itself cannot be reconstructed).

In a known way, there can also be unknown states generally indicated with X. It is important to avoid the propagation of these unknown states since they can alter the corresponding output signatures. This propagation block is in particular obtained by means of techniques and circuits that mask and/ or block the sources that generate these unknown states, exactly avoiding their propagation.

Devices DUT are also known also provided with integrated self-test circuits or systems of the BIST type (acronym of "Built In Self Test"), especially used in the case of test of the relative digital circuits, as the system shown in FIG. 3, globally indicated with 10.

In particular, during its normal operation, the device DUT 10 does not use its self-test circuits BIST and communicates with the external world through the inputs PI and the outputs PO, while during a test mode the self-test circuits BIST are activated.

The device DUT 10 is in particular provided with a digital portion or digital circuit 11 as well as with self-test circuitry, in particular comprising a generator block (i.e., a suitable circuit) 12 or test pattern generator (TPG) which automatically generates the test vectors that are applied at the input of the digital circuit 11, while its output signatures are brought to a further block, in particular an analyzer block 13 or block ORA (acronym of "Output Response Analyzer) that compacts and/or compresses them and compares them with the awaited compacted and/or compressed signatures, contained in the testing system.

All the test operations are however controlled by a controller 14 indicated as BIST controller that supplies at the output a result of the binary test, which takes the values Good (for a test that has been successful) or Fail (for a failure of the test). Normally, a multiplexer Mux is interposed between the block generator 12 and the digital circuit 11.

The controller 14 receives in particular a switch signal for the choice of the operation mode of the device DUT 10, between a normal mode and a test mode as above described and supplies then at the input of the digital circuit 11a reconfiguration signal Reconf.

In particular, the generator block 12 generates the test vectors and transmits them, through the multiplexer Mux to the digital circuit 11. In the analyzer block 13 suitable memory banks or in any case an algorithmic circuit are provided wherein the signatures awaited from digital circuit 11 are wired: the analyzer block 13 compares the response of the digital circuit 11, in response to the input stimuli, with these memorized signatures and transmits the result to the controller 14.

It is to be noted that both the generator block 12 and the analyzer block 13 are wired and thus difficult to be changed.

Further circuits for the diagnosis of the failure can be considered.

Also in the case of BIST circuits attention should be paid to the unknown states, for obtaining in any case strong circuits, indicated as X-tolerant circuits.

It is also known to execute the testing of at least one integrated circuit by using radiofrequency signals RF possibly overlapped onto a supply line or power line. Alternatively, these signals RF can be exchanged through electromagnetic waves by using a wireless channel.

In particular, the signals RF are received or transmitted by using transceiver/transponder blocks, which in the case of a wireless communication channel are connected to antennas that can be of various types, for example with magnetic dipole or with hertzian dipole or of the capacitive type or else.

The vastness of the cases considered implies that the testing of a device DUT integrated on a wafer is often faced case by case studying a suitable technique of DFT (acronym of "Design For Test") to be applied to the specific device DUT according to a precise type of tester ATE.

The growing complexity of the integrated circuits and the limited resources of a generic tester ATE often do not allow however to have high testing parallelisms, and this increases the costs of the testing itself.

Moreover, the high complexity implies a high information exchange between the tester ATE and the device DUT, which further complicates the architecture of the tester ATE, increasing its cost, for example requiring big size memories.

In the case of testing using signals overlapped onto the power line or through a wireless communication channel, also the device DUT gets complicated due to the presence therein of suitable transceiver/transponder blocks (indicated also as RxTx).

The classical approach thus consists in applying the techniques of DFT to a single device DUT, since it is repeated as it is on the whole wafer whose testing is to be executed, and this testing consists in the bidirectional exchange of information between the tester ATE and the device DUT.

BRIEF SUMMARY

One embodiment of the present disclosure is a testing method of a generic device DUT in any case complex, having such structural and functional characteristics as to allow to reduce the testing costs overcoming the limits and the drawbacks affecting the methods according to the prior art.

One embodiment of the present disclosure is a testing method where there is only one-way transmission of signals, and in particular where the signals pass only from the tester ATE towards the at least one device DUT under testing.

One embodiment is a testing method of at least one device DUT provided with an integrated testing circuit and in communication with at least one tester ATE where messages/instructions/test signals/information are sent only from said tester ATE to said device DUT.

More in particular, the disclosure comprises the following supplementary and optional characteristics, taken alone or, in case, in combination.

According to an aspect of the disclosure, this testing method may further comprise the steps of:
 executing a test on the basis of said messages/instructions/test signals /information;
 comparing the results obtained by said test on the basis of awaited requests specified by said messages/instructions/test signals/information; and
 generating at least one result information that takes a first value in case of correspondence of said results obtained with said awaited responses, and a second value in case of non-correspondence of said results obtained with said awaited responses.

According to another aspect of the disclosure, this testing method may further comprise a storage step of said result information in a result block of said at least one device DUT.

In particular, according to this aspect of the disclosure, the testing method may further comprise a reading step of said result information in said result block.

Yet according to this aspect of the disclosure, the testing method may further comprise an elimination step of said at least one device DUT in case said result information being read by said result block during said reading step has said second value.

One embodiment is a testing architecture of the type comprising at least one device DUT provided with at least one circuit and associated with a tester ATE, wherein said at least one device DUT receives information and comprises an integrated testing circuit receiving at least one awaited response signal corresponding to a condition of correct operation of said at least one circuit, said integrated testing circuit comprising means for the comparison between said awaited response signal and an output response of said at least one circuit and means for the generation of a result information that takes a first value in case of correspondence between said output response with said awaited response signal, and a second value in case of non-correspondence between said output response and said awaited response signal.

According to an aspect of the disclosure, said integrated testing circuit of said at least one device DUT may comprise at least one input decoder block, connected to an antenna through a receiver for receiving said information, among which said awaited response signal, and said tester ATE may comprise at least one transmitter connected to an antenna for realizing a wireless communication channel between said at least one device DUT and said tester ATE.

According to another aspect of the disclosure, this testing architecture may comprise at least one wired communication channel of connection between said tester ATE and said at least one device DUT for the transmission of information towards said at least one device DUT through signals of the electrical type.

Further, according to an aspect of the disclosure, said integrated testing circuit of said at least one device DUT may comprise at least one decoder block in turn containing a high speed serial interface connected to a high speed digital input terminal for the reception of information for said at least one device DUT.

According to another aspect of the disclosure, said integrated testing circuit may comprise at least a receiver for radiofrequency signals.

Moreover, according to another aspect of the disclosure, said integrated testing circuit may comprise at least one result block receiving said result information.

According to this aspect of the disclosure, said result block comprises at least one among:
 a non-volatile memory element, where said result information is written;
 a non-volatile memory of the FAMOS type;
 a fuse link;
 an anti-fuse link;
 a transmitter connected to said receiver of said at least one device DUT employing the technique of load modulation;
 a transmitter connected to at least one wireline of said at least one device DUT employing a communication technique that consists in varying at least one electric parameter of said at least one wireline.

Furthermore, according to an aspect of the disclosure, said at least one circuit may comprise a decompression block and a compression or compaction block for compressing or compacting an output signature before sending it to said means for the comparison with said awaited response signal, possibly compressed or compacted in a similar way.

Furthermore, according to an aspect of the disclosure, this testing architecture may comprise a plurality of devices DUT in communication with said tester ATE.

Finally, according to an aspect of the disclosure, said at least one circuit may comprise one or more among:
 digital circuits;
 analog circuits;
 circuits RF;
 circuits MEMS; and
 circuits different from the previous ones.

The characteristics and the advantages of the testing method and of the testing architecture according to the disclosure will be apparent from the following description made by way of indicative and non-limiting example with reference to the annexed drawings.

DETAILED DESCRIPTION

Figure 1:
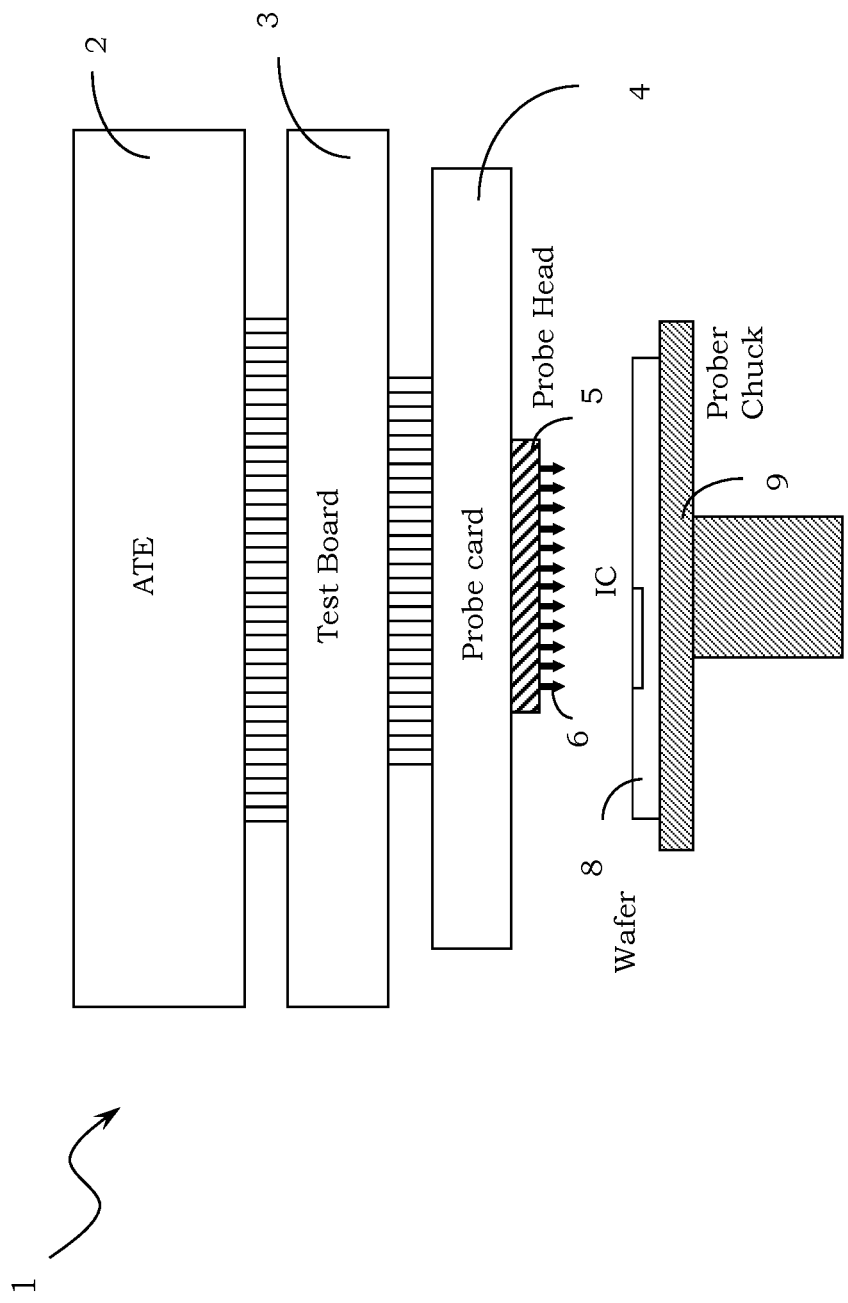
FIG. 1 schematically shows a portion of a testing system realized according to the prior art.
Figure 2:
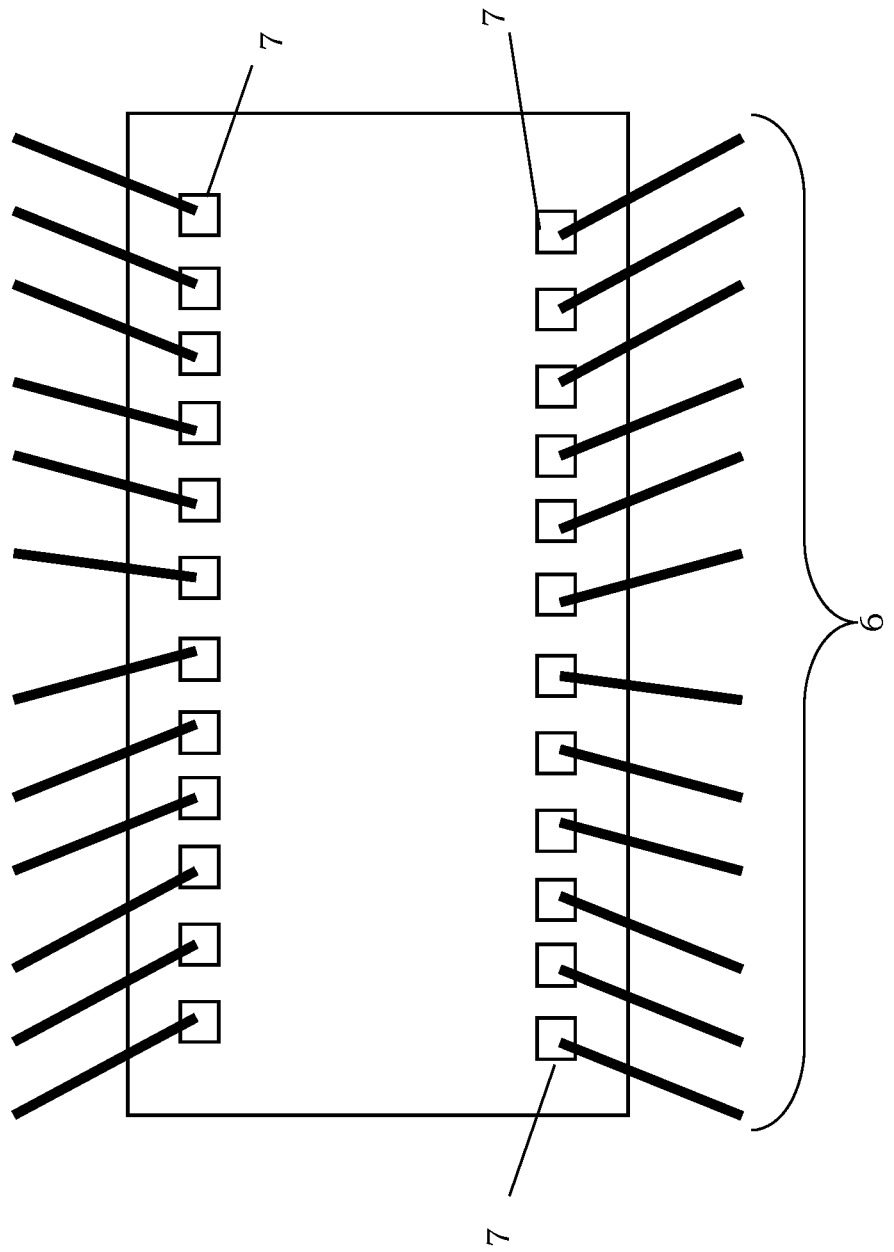
FIG. 2 schematically shows a known device DUT to be tested provided with a plurality of contact pads.
Figure 3:
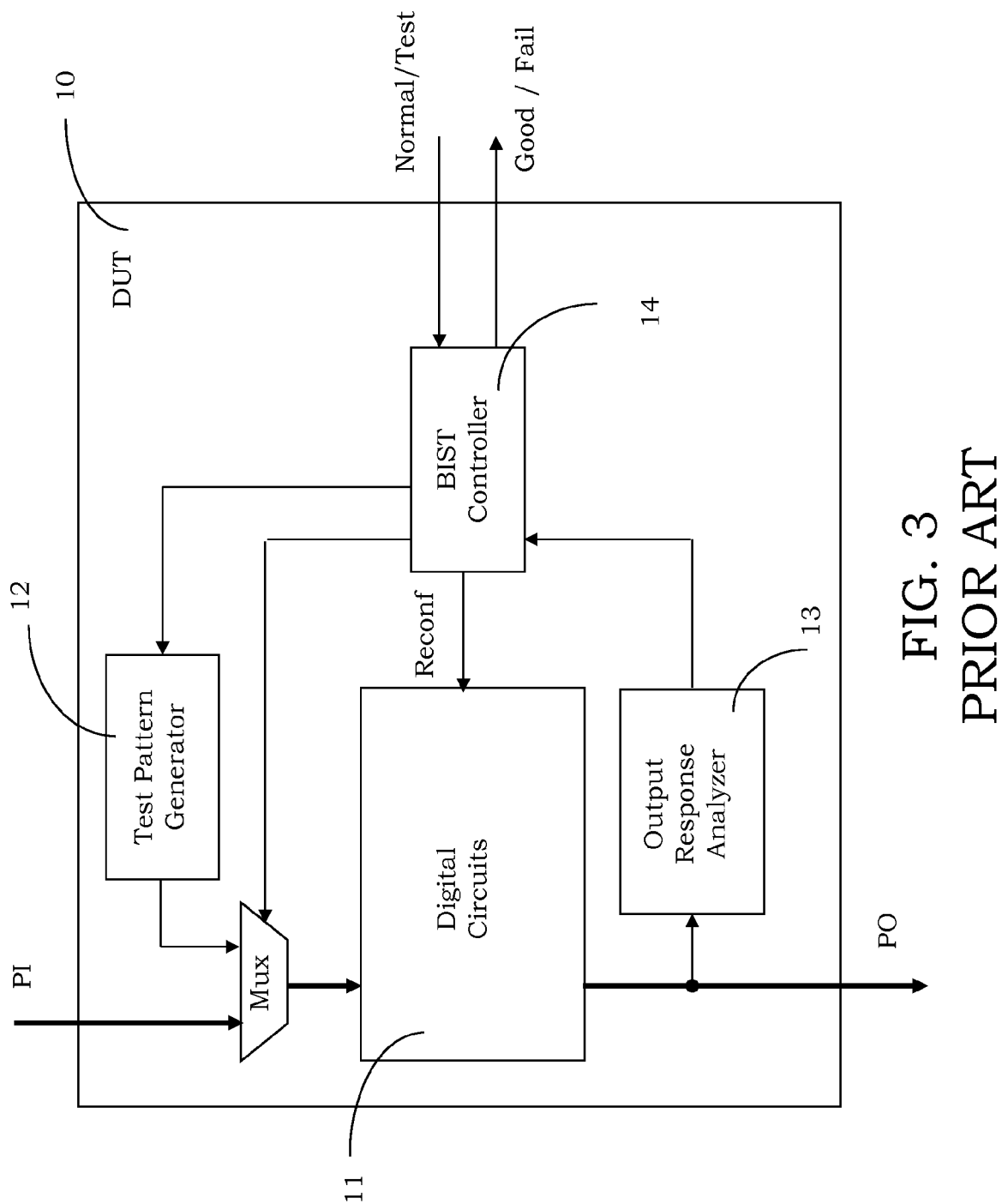
FIG. 3 schematically shows a device DUT provided with self-test circuit BIST realized according to the prior art.
Figure 4:
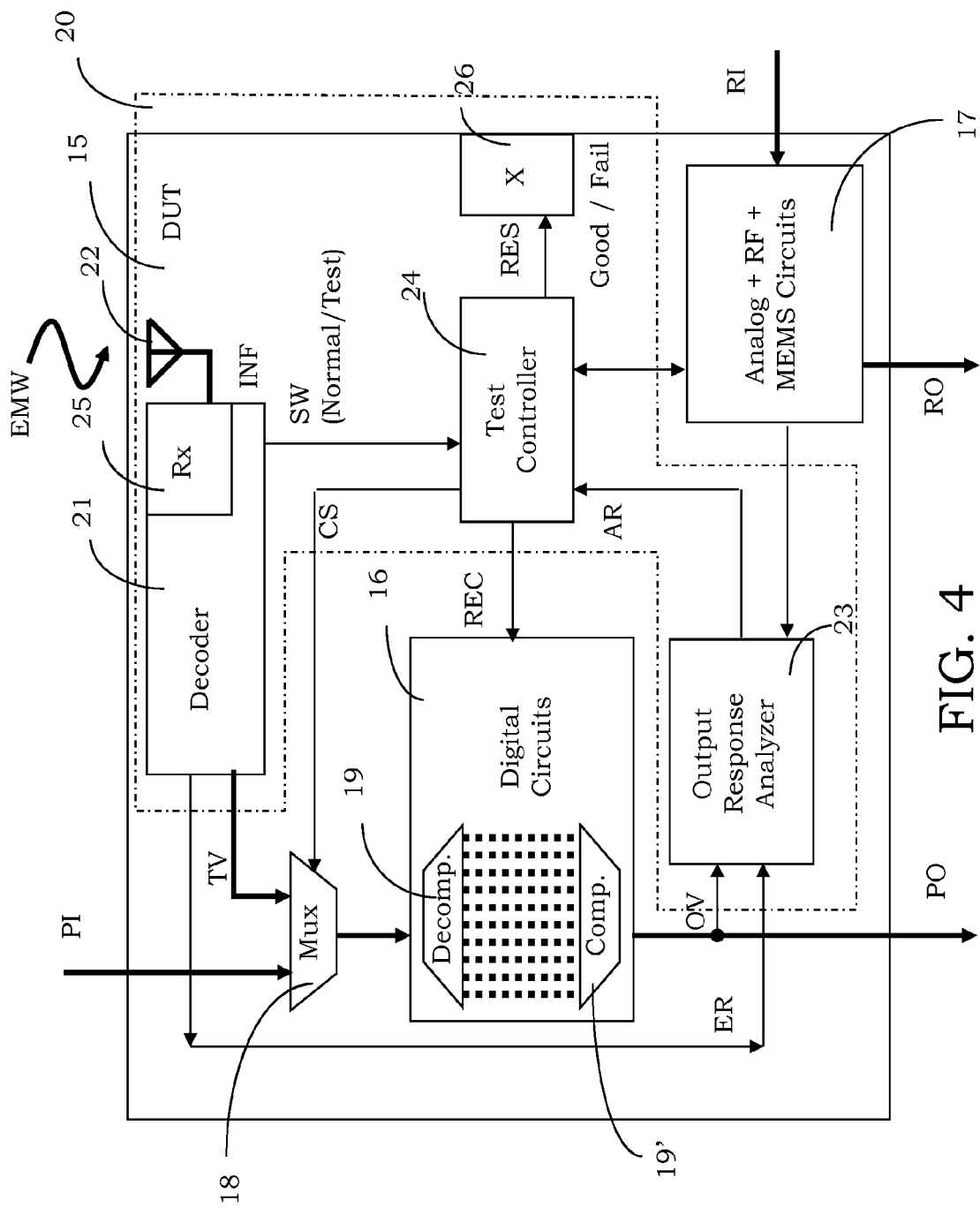
FIG. 4 schematically shows a device DUT provided with an integrated testing circuit and able to implement a one-way testing method according to the disclosure.

With reference to these figures, FIG. 4 schematically shows a device DUT, globally indicated with 15, comprising at least one digital portion, or digital circuit 16 and remaining circuitry or non-digital circuit 17, for example comprising analog components, radiofrequency (RF) components or of the MEMS type (acronym of: "Micro Electro-Mechanical Systems") of the device DUT 15. These circuits or components are also indicated as resources of the device DUT 15.

In particular, the device DUT 15 comprises a test mechanism, such as at least one test circuit or a portion thereof of the type previously described in relation with the prior art.

It is to be noted that the figures show schematic views of various elements of a testing apparatus according to the disclosure and they are not drawn to scale, they are instead drawn so as to underline the important characteristics of the disclosure, their shape and position having the possibility to be varied according to the desired application.

According to an aspect of the disclosure, the device DUT 15 comprises in particular an integrated testing circuit 20, connected to the digital circuit 16 and to the non-digital circuit 17 of the device DUT 15, for example by means of a multiplexer 18.

More in particular, the integrated testing circuit 20 in turn comprises at least one input decoder block (i.e., a suitable circuit) 21 (decoder), connected to an antenna 22 and to the multiplexer 18, as well as an analyzer block 23 of the output responses (Output Response Analyzer).

Moreover, the integrated testing circuit 20 comprises at least one controller 24 (Test Controller), connected to the digital circuit 16 and to the non-digital circuit 17 as well as to a result block 26 and to the multiplexer 18.

According to an aspect of the disclosure, the decoder block 21 can comprise or however be connected to a receiver 25 (Rx) connected to the antenna 22.

More in detail, the decoder block 21 is connected to the controller 24 and supplies it with at least one communication signal SW, that takes in particular a first value Normal corresponding to a normal operation mode of the device DUT 15 and a second value Test corresponding to a testing mode of the device DUT 15.

According to an aspect of the disclosure, the device DUT 15 comprises then at least the receiver 25 connected to the antenna 22 for receiving messages/instructions/test signals/information INF that are then suitably decoded and used in the integrated testing circuit 20 of the device DUT 15 itself.

During its normal operation, the device DUT 15 does not use its integrated testing circuit 20 and communicated with the outer world through its normal input and output terminals, indicated with PI and PO respectively for the digital circuit 16 and with RI and RO respectively for the non-digital circuit 17.

According to an aspect of the disclosure, in test mode, in particular upon receipt of a switch signal SW with value Test, the information INF received by the decoder block 21 through the receiver 25 are decoded, in part used by the controller 24 and in part sent at the input of the digital circuit 16 that supplies in turn an output signature OV. More in particular, these decoded information INF comprise at least one test vector TV and an awaited response signal ER.

Suitably, according to an aspect of the disclosure, the awaited response signal ER is always received through the receiver 25 and transmitted from the decoder block 21 to the analyzer block 23, which compares it with the output signature OV of the digital circuit 16 obtained further to the application to the digital circuit 16 itself of the test vector TV. More in particular, the decoder block 21 transmits the test vector TV to the digital circuit 16 through the multiplexer 18.

The digital circuit 16 possibly comprises a decompression block 19 and a compression or compaction block 19' for compressing or compacting the output signature OV before sending it to the analyzer block 23 for the comparison with the awaited response signal ER, possibly compressed or compacted in a similar way.

These decompression block 19 and compression or compaction block 19' allow to implement various known techniques of DFT, like the decompression and compression or compaction of the stimuli or test vectors and signatures.

The analyzer block 23 transmits the analysis AR of the response to the controller 24.

After having executed a generic test or a test flow, the controller 24 sends a result information RES to the result block 26, this result information RES having the possibility to take a first value Good in case of positive result of the test or test flow, i.e., in case of correspondence between the signature OV at the output of the digital circuit 16 with the awaited response signal ER supplied to the analyzer block 23 by the decoder block 21, and a second value Fail in case of failure of the test or test flow, i.e., of non-correspondence between the signature OV at the output of the digital circuit 16 and the awaited response signal ER.

The controller 24 also supplies a control signal CS to the multiplexer 18 so as to connect the digital circuit 16 to the decoder block 21 or to the inputs PI on the basis of the operation mode.

The device DUT 15 comprises also a non-digital circuit 17 for sake of simplicity only schematically indicated as connected to the analyzer block 23 and to the controller 24 for the reception and transmission of corresponding signals, the considerations made for the digital circuit 16, and in particular the testing method applied thereto, having the possibility to be extended in an obvious way also to the non-digital circuit 17 by arranging suitable test circuits, not shown in the figure.

Figure 5A:
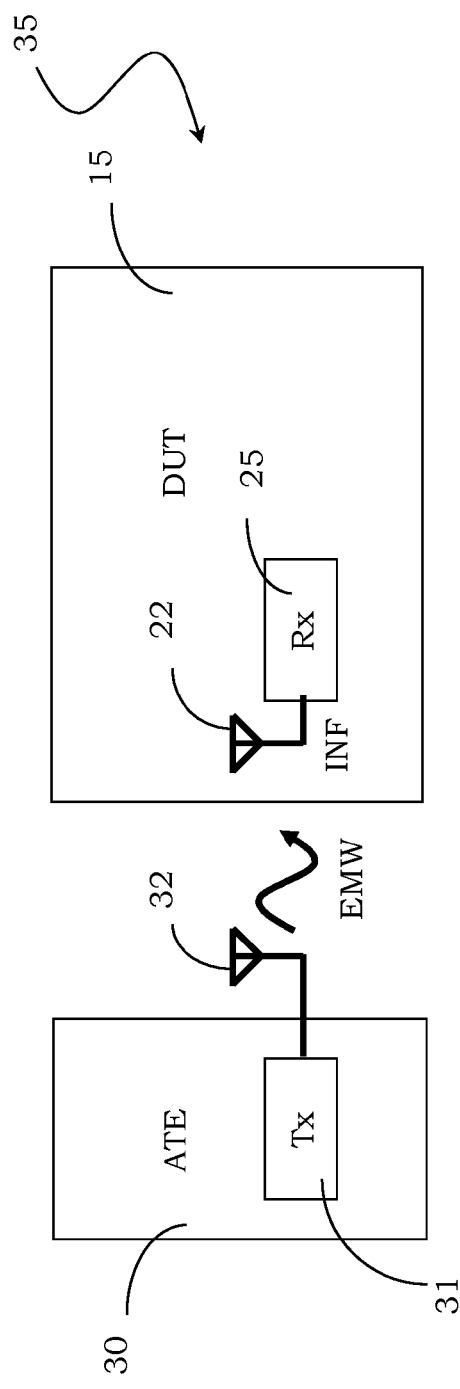
FIGS. 5A and 5B schematically show testing architectures for the implementation of the one-way testing method according to the disclosure.

According to an aspect of the disclosure, a testing architecture 35 comprises at least one device DUT 15 provided with the receiver 25 connected to the antenna 22 in communication with a tester ATE 30, provided in a dual manner with a transmitter 31 (also indicated as Tx) connected to an antenna 32, as schematically shown in FIG. 5A.

In this way, the testing is substantially executed by a wireless communication channel through which the tester ATE 30 sends information INF towards the device DUT 15 through electromagnetic waves EMW.

The tester ATE 30, in particular its transmitter 31 transmits information INF through its antenna 32, these information INF being thus received by the antenna 22 connected to the receiver 25 of the device DUT 15.

The specific communication, modulation and coding techniques described are not obviously to be considered as limitative. It is possible, for example, to consider transmissions by means of the so called CDMA technique (acronym of: "Code Division Multiple Access").

Figure 5B:
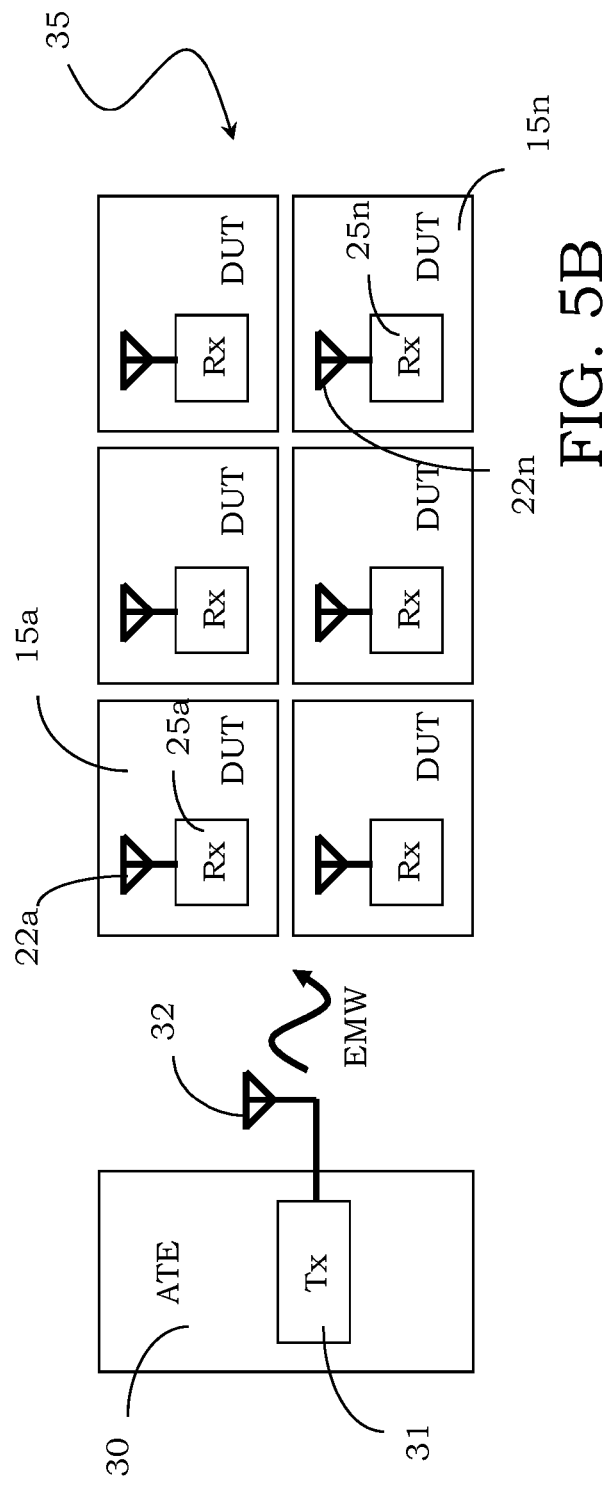

This is particularly useful for the voluminous production where the information INF are sent from the tester ATE 30 to at east two DUT, in general to a plurality of devices DUT, 15a . . . 15n, each provided with its receiver 25a . . . 25n and with its antenna 22a . . . 22n, as schematically shown in FIG. 5B.

It is to be underlined that in this way the testing method according to the disclosure can be executed with a high parallelism, without requiring a transmitter in each device DUT. The tester ATE 30 can include a transmitter 31 that is shared by all the devices DUT 15 or at least by part of them.

Possibly, the tester ATE 30 can supply also power to the device DUT 15 for its operation.

In case the device DUT 15 is a low power electronic device, it can thus be supplied through the energy of the electromagnetic waves received through its antenna 22.

Alternatively, the device DUT 15 can be supplied in a traditional way through the probes of the probe card.

In substance, the testing architecture 35, comprising at least one device DUT 15 provided with an integrated testing circuit 20 comprising at least one decoder block 21 provided with a receiver 25 connected to an antenna 22, and in communication with at least one tester ATE 30, is able to implement an one-way testing method according to the disclosure.

In its more general aspect, the testing method according to an embodiment of the disclosure comprises sending of messages/instructions/test signals/information INF exclusively from the tester ATE 30 to the device DUT 15.

In particular, this testing method further comprises the steps of:
executing a test on the basis of the messages/instructions/test signals /information INF;
comparing the results obtained by the test on the basis of awaited responses specified by the messages/instructions/test signals/information INF; and
generating at least one result information RES that takes a first value (Good) in case of correspondence of the results obtained with the awaited responses, and a second value (Fail) in case of non-correspondence of the results obtained with the awaited responses.

More in particular, in case of digital circuits with flip flops, using test vectors TV, this one-way testing method comprises the steps of:
receiving a switch signal SW with value Test;
receiving through the antenna 22 and the connected receiver 25 at least one test vector TV for a digital circuit 16 of the device DUT 15;
receiving through the antenna 22 and the connected receiver 25 also an awaited response signal ER corresponding to a condition of correct operation of the digital circuit 16;
supplying the test vector TV to the digital circuit 16 and obtaining a corresponding output signature OV;
comparing the output signature OV of the digital circuit 16 with the awaited response signal ER;
generating a result information RES that takes a first value Good in case of positive result of the test, i.e., in case of correspondence between the output signature OV with the awaited response signal ER, and a second value Fail in case of failure of the test, i.e., of non-correspondence between the output signature OV and the awaited response signal ER.

Moreover, according to an aspect of the disclosure, the testing method comprises a storing step of the result information RES in a result block 26 that is read in one of the selection steps of the device DUT 15.

More in particular, the method comprises a reading step of this result block 26 and the elimination of the device DUT 15 in case the result information RES contained therein has the second value Fail.

It is to be underlined that this testing method is a one way test, the device DUT 15 receiving only suitable control and test signals and limiting itself to the storage of the test results in the result block 26.

Figure 6A:
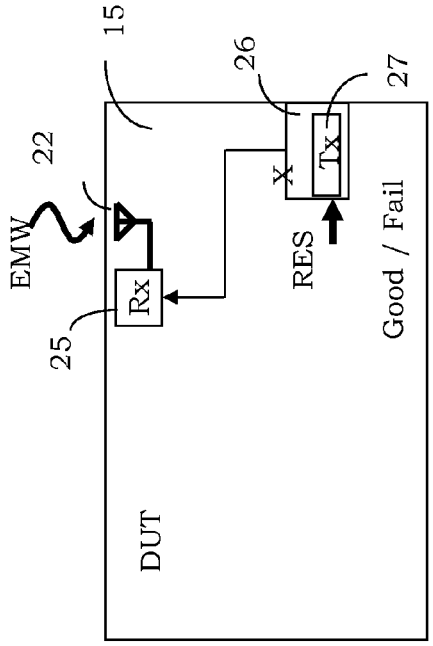
FIGS. 6A-6D schematically show further embodiments of a detail of the device DUT provided with an integrated testing circuit according to the disclosure.

According to an aspect of the disclosure, the result block 26 comprises a non-volatile memory element, where the result information RES is written, and in particular its values Good and Fail, as schematically shown in FIG. 6A.

This memory element can be constituted by a non-volatile memory as for example at least one FAMOS or by a fuse link or by an anti-fuse link.

In particular, when using a fuse link for realizing the result block 26, the same can be melted after a first failure result (Fail) of a generic test being part of a test flow to which the device DUT 15 is subjected, generally indicated as EWS1; this test flow can in particular comprise a plurality of tests.

Figure 7B:
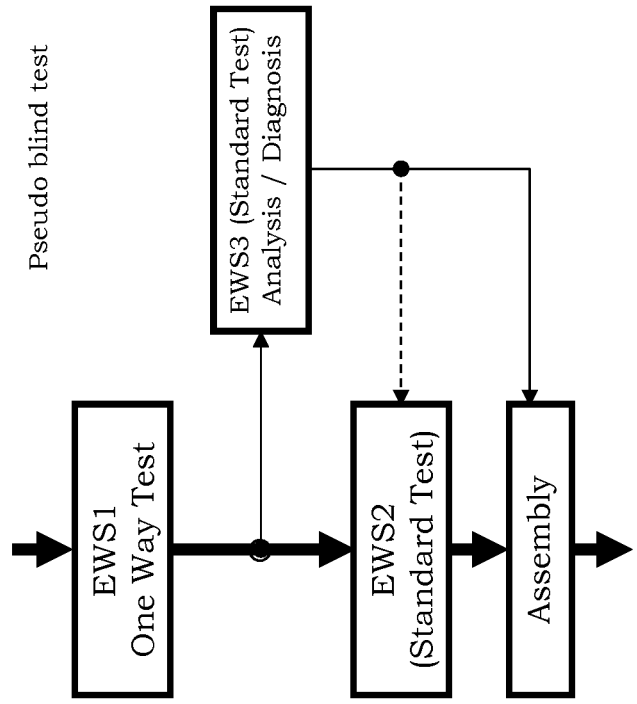
FIGS. 7A and 7B schematically show flows of tests of integrated circuits comprising at least one flow of one-way test according to the disclosure.
Figure 7A:
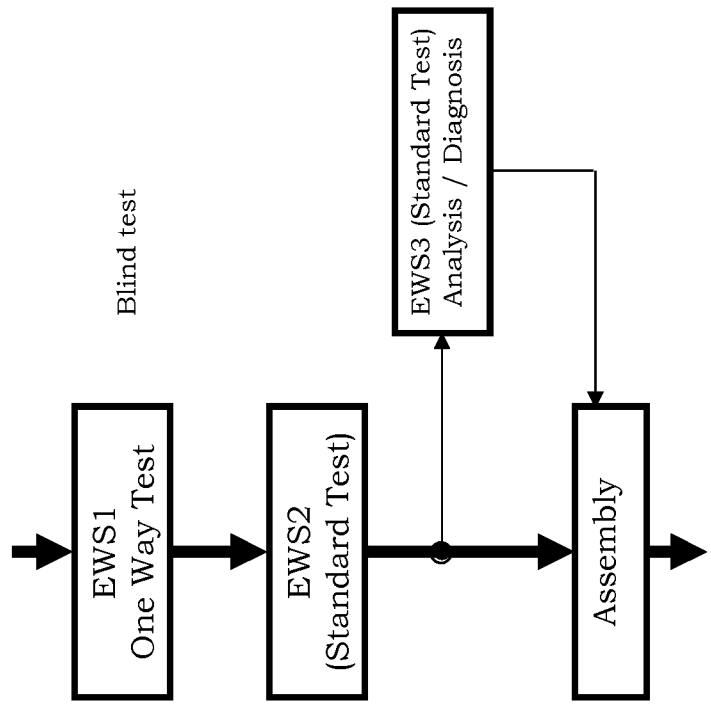

According to this aspect of the disclosure, the testing method implemented by the testing architecture 35 including at least one device DUT 15 provided with a result block 26 realized by means of a fuse link is a blind one-way test/test flow EWS1 for the tester ATE 30, as schematically shown in FIG. 7A.

In fact, the result information RES of the test (Good or Fail) can be read only during a successive standard test flow, generically indicated as EWS2.

It is to be noted that the one-way testing method according to the disclosure does not transmit any piece of information about the test executed, storing only the result information RES, indeed. A further test flow can be employed, indicated as EWS3 for the analysis/diagnosis of the problems, with the aim of introducing the suitable corrections, executed for example only on a sample of some wafers considered as critical.

It is underlined that the one-way test flow EWS1 for verifying the operation of the device DUT 15 could be more burdensome and require a longer test time with respect to the standard test flow EWS2, which can be also limited to the sole reading of the result information RES (Good/Fail) stored in the result block 26 of each device DUT 15.

Figure 6B:
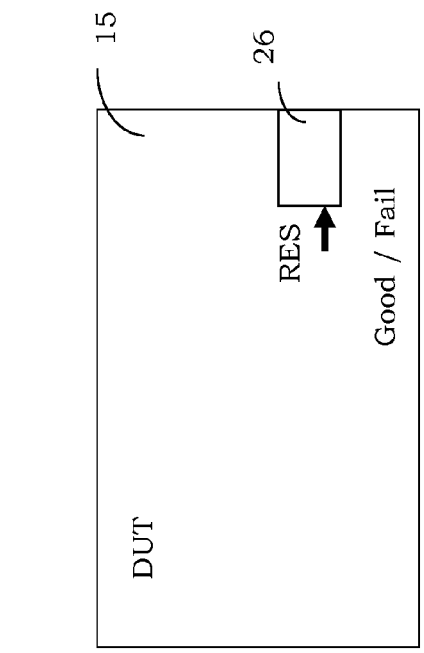

According to a further aspect of the disclosure, the result block 26 can comprise a transmitter (Tx) 27 connected to the receiver 25, as schematically shown in FIG. 6B.

In particular, it is possible to use a transmitter 27 similar to the wireless transmitters used for the RFID (acronym of:

"Radio Frequency Identification") and employing the so called load modulation technique where the value of the load is modulated/varies.

It is to be underlined that in this embodiment, for example through a suitable control by the tester ATE 30 and the load modulation technique, the device DUT 15 varies a load (not shown) that the tester ATE 30 sees through the wireless transmission channel: also in this case the device DUT 15 thus does not send information to the tester ATE 30, but the tester ATE 30 acquires information, possibly coded, from the device DUT 15 measuring the variation of at least one of its electric/electromagnetic parameters through a signal sent by the tester ATE 30 to the device DUT 15 itself.

In this case, the one-way test flow EWS1 is not a completely blind test flow and the information necessary for the analysis/diagnosis of the failures (which are however lost at the level of this test) can be recovered in cases of interest by using a dedicated test flow, the analysis test flow EWS3, as schematically shown in FIG. 7B.

After the analysis test flow EWS3, the few wafers involved can go ahead in the normal test flow or pass to the successive assembling steps (Assembly).

Obviously, the one-way test flow EWS1 is not necessarily the first test flow to which the device DUT 15 is subjected.

Figure 8A:
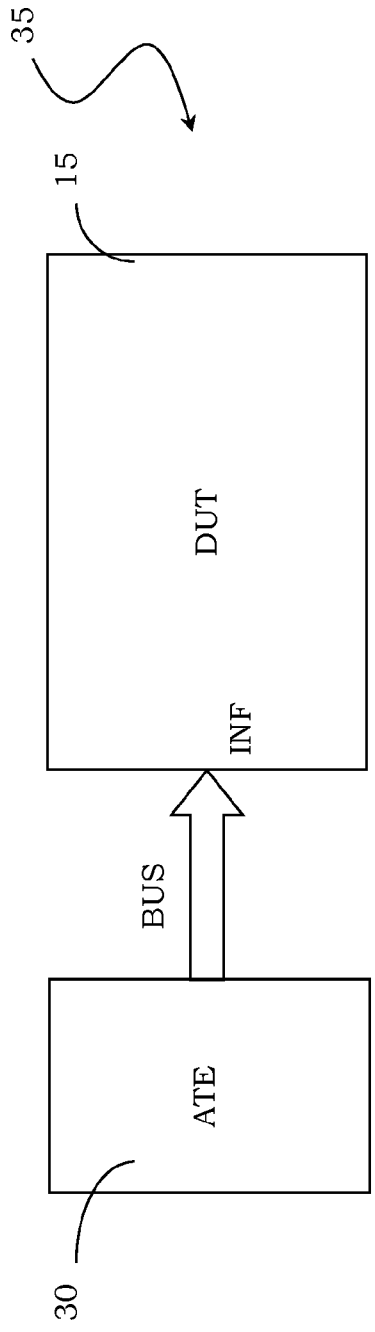
FIGS. 8A, 8B and 9 schematically show alternative embodiments of testing architectures for the implementation of the one-way testing method according to the disclosure.

According to a further aspect of the disclosure, the testing architecture 35 comprises the tester ATE 30 and the at least one device DUT 15 connected to each other through a wired communication channel or wireline, indicated with BUS, whereon information INF are sent towards the at least one device DUT 15 through signals of the electric type, as schematically shown in FIG. 8A.

Figure 8B:
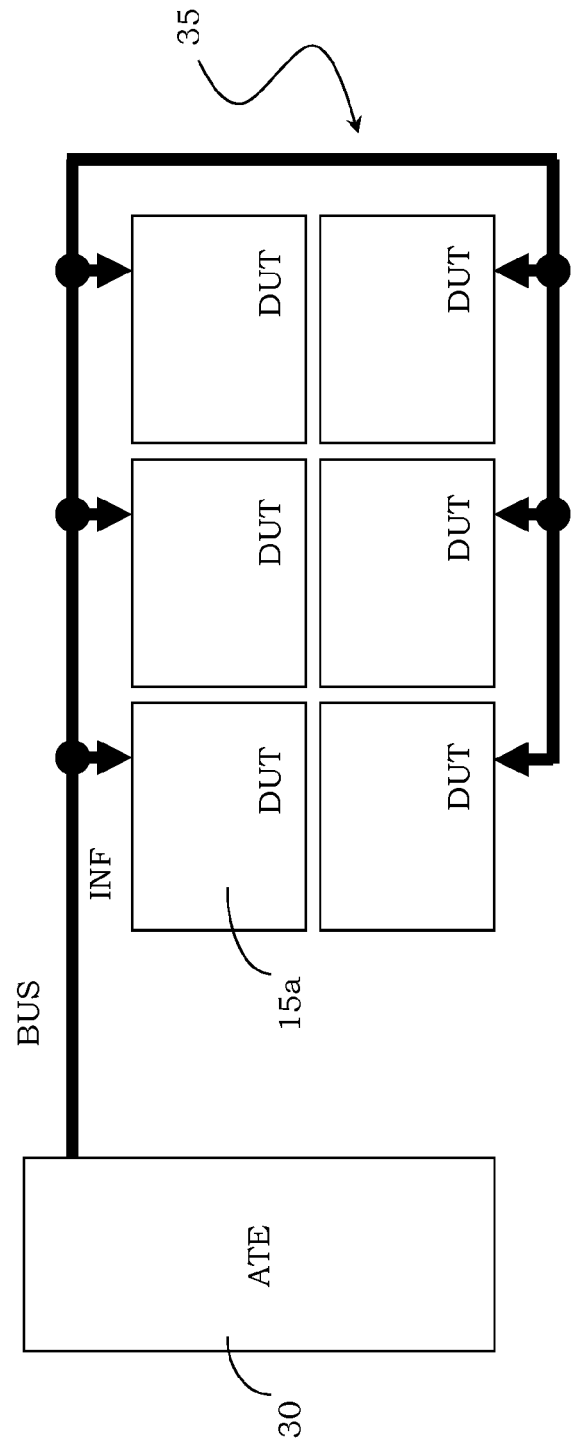

Also in this case, it is possible to connect through the wired communication channel BUS the tester ATE 30 to at least two devices DUT, in particular a plurality of devices DUT 15a ... 15n, as schematically shown in FIG. 8B, by a testing having a high parallelism.

In this way, the testing resources can be shared among more devices DUT 15, that can be provided with resources of protection against the short circuits, such as for example the fuse link, for avoiding that the short circuit of a line of the wired communication channel BUS jeopardizes the testing of the other devices DUT 15.

Figure 9:
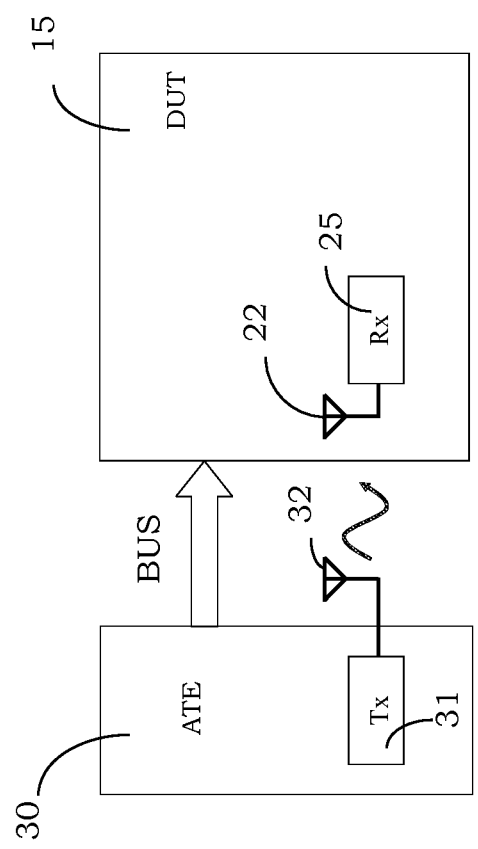

It is obviously possible to realize hybrid implementations, for example by using both wireless communication channels and wired communication channels between the tester ATE 30 and the at least one device DUT 15, as schematically shown in FIG. 9.

Figure 10:
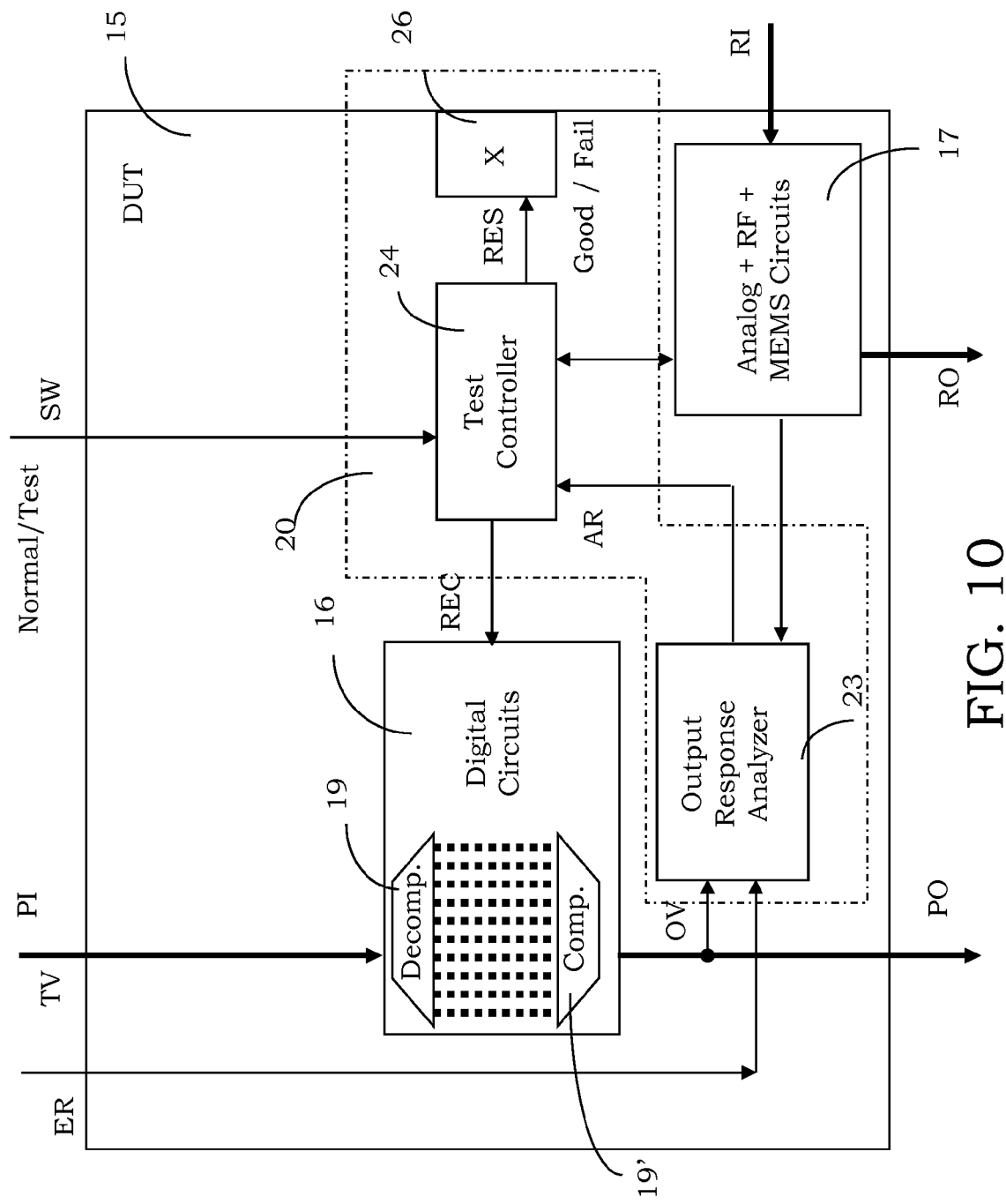
FIGS. 10-13 schematically show further embodiments of a device DUT provided with an integrated testing circuit and able to implement a one-way testing method according to the disclosure.

According to this further aspect of the disclosure in which a wired communication channel or wireline is used, the device DUT 15 comprises an integrated testing circuit 20 in turn comprising the analyzer block 23 and the controller 24, which are directly connected to the wired communication channel BUS wherefrom the awaited response signal ER and the switch signal SW are respectively received, as schematically shown in FIG. 10.

Also in this case, during its normal operation the device DUT 15 does not use the integrated testing circuit 20 and communicates with the external world through its normal inputs and outputs, PI and PO.

In test mode, i.e., at the receipt of a switch signal SW with value Test, the information is sent by the tester ATE 30 through the wired communication channel BUS. In particular, the tester ATE 30 supplies the digital circuit 16 of the device DUT 15 with the test vector TV and the analyzer block 23 with the awaited response signal ER. As previously seen, the analyzer block 23 receives from the digital circuit 16 the output signature OV and it compares them with the awaited response signal ER. The analyzer block 23 transmits the analyzed response AR to the controller 24 for the test that produces the result information RES that is stored in the result block 26.

The digital circuit 16 possibly comprises a decompression block 19 and a compression or compaction block 19' for compressing or compacting the output signature OV before sending it to the analyzer block 23 for the comparison with the awaited response signal ER, possibly compressed or compacted in a similar way.

These decompression block 19 and compression or compaction block 19' allow to implement various known techniques DFT, like the decompression and compression or compaction of the stimuli or test vectors and signatures.

Figure 11:
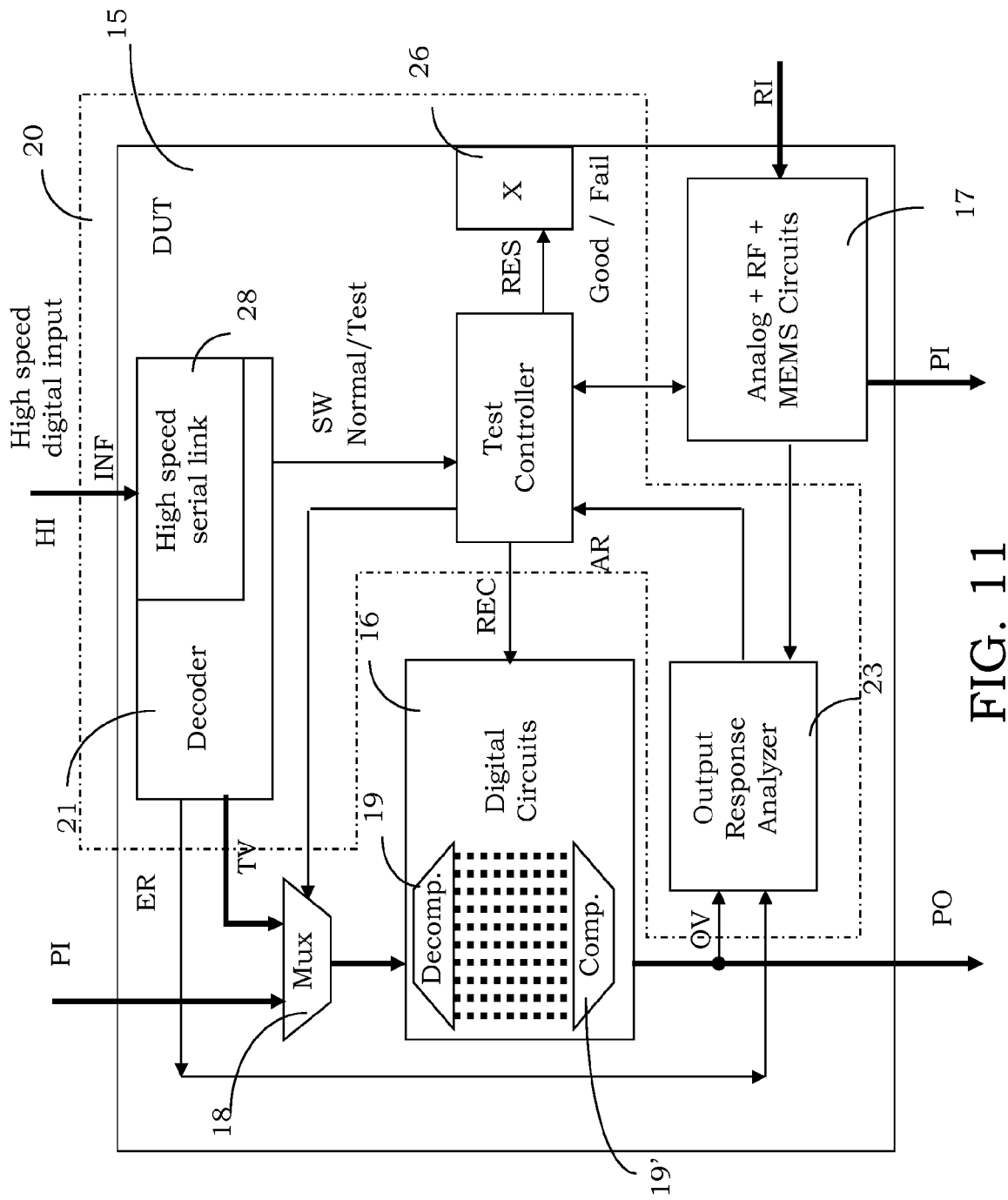

According to a further aspect of the disclosure, the integrated testing circuit 20 of the device DUT 15 can comprise a decoder block 21 in turn containing a high speed serial interface 28 connected to a high speed digital input terminal HI, as schematically shown in FIG. 11.

In this case, in test mode the information INF coming from the high speed serial interface 28 are decoded and suitably partially used by the controller 24 and partially sent at the input of the digital circuit 16 for obtaining the output signature OV to be supplied to the analyzer block 23.

As previously seen, the analyzer block 23 compares the output signature OV with the awaited response signal ER and transmits the analyzed response AR to the controller 24 for the test that produces the result information RES that is stored in the result block 26.

A decompression block 19 and a compression or compaction block 19' can be provided for compressing or compacting the output signature OV before sending it to the analyzer block 23 for the comparison with the awaited response signal ER, possibly compressed or compacted in a similar way.

Figure 12:
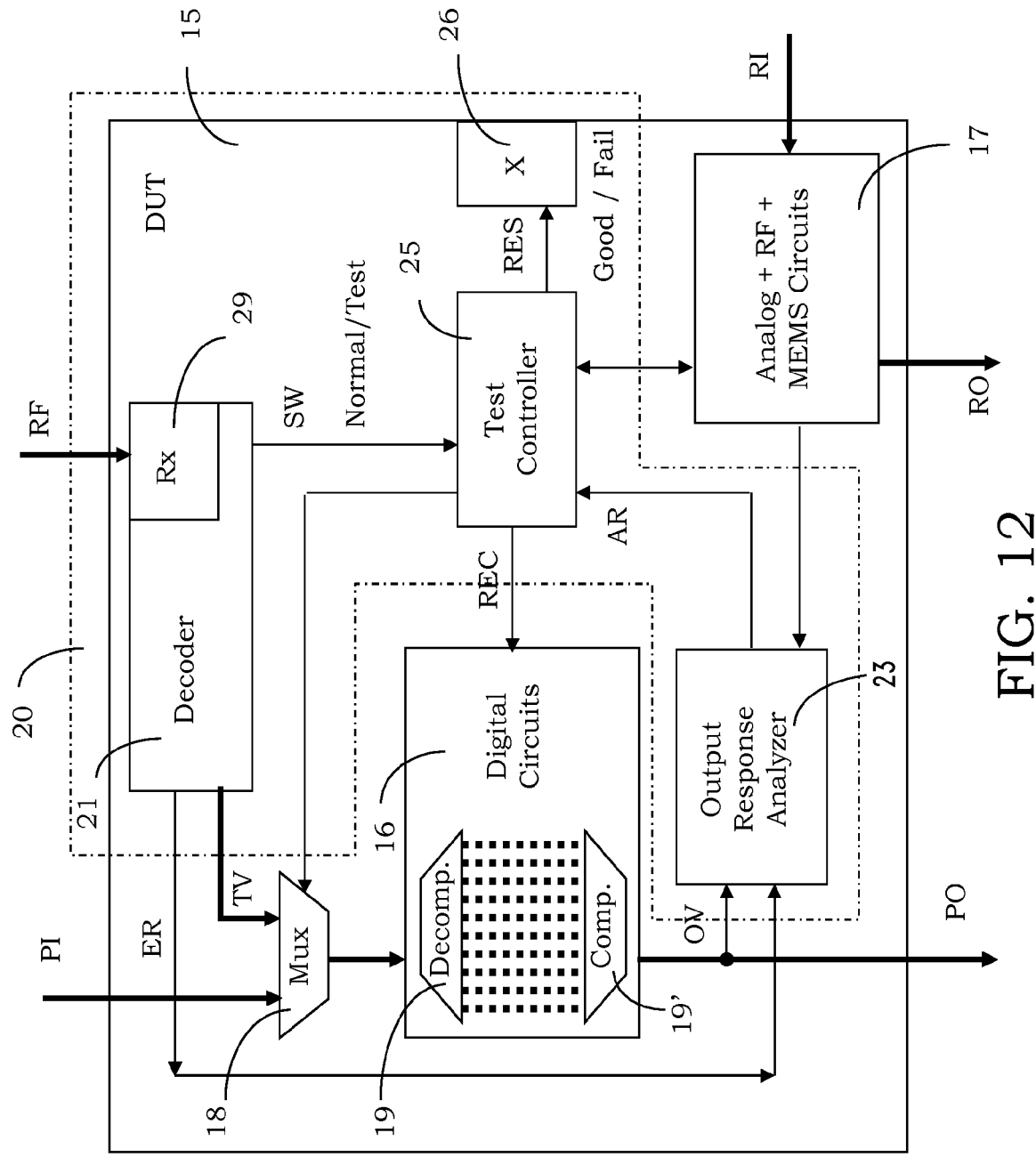

Furthermore, according to another aspect of the disclosure, the integrated testing circuit 20 of the device DUT 15 can contain a receiver 29 for radiofrequency signals or signals RF, as schematically shown in FIG. 12.

It is to be noted that these signals RF can be used alone or also overlapped on a power line.

As previously said, the result block 26 can be realized by means of at least one non-volatile memory element, a fuse link or an anti-fuse link, with realization of a blind one-way test flow EWS1, as explained in relation to FIG. 7A.

Furthermore, the result block 26 can comprise a transmitter (Tx) using a suitable communication technique, which can vary at least one electric parameter of the wired transmission line or wireline for realizing a pseudo-blind one-way test flow EWS1, as explained in relation to FIG. 7B.

It is to be underlined that in this alternative embodiment, for example through a suitable control by the tester ATE 30, the device DUT 15 varies one of its electric parameters through a suitable circuit, and the tester ATE 30 can sense this variation on the at least one wired line PIj of the wireline transmission channel: also in this case the device DUT 15 thus does not send information to tester ATE 30, but the tester ATE 30 acquires information, possibly coded, from the device DUT 15 measuring the variation of at least one of its electric parameters, for example the current I, through a suitable signal sent by the tester ATE 30 to the device DUT 15 itself.

Figure 6C:
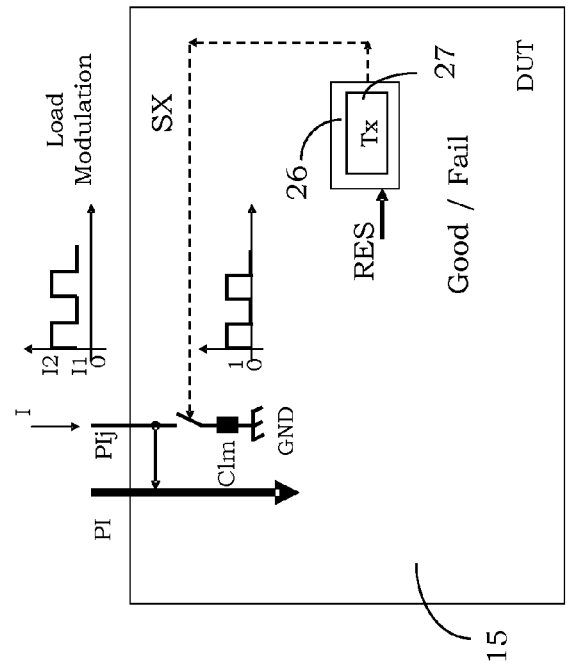

In this sense, as shown in FIG. 6C, for example an electronic switch could be in series with the line PIj with the aim of disconnecting/connecting it so as to vary for example the absorbed current (or voltage). The tester ATE 30 could determine the variation of the at least one electric parameter executing a suitable measure on the at least one wired line PIj of the wireline transmission channel, for example measuring the variation of the absorption of current (or the voltage variation).

Figure 6D:
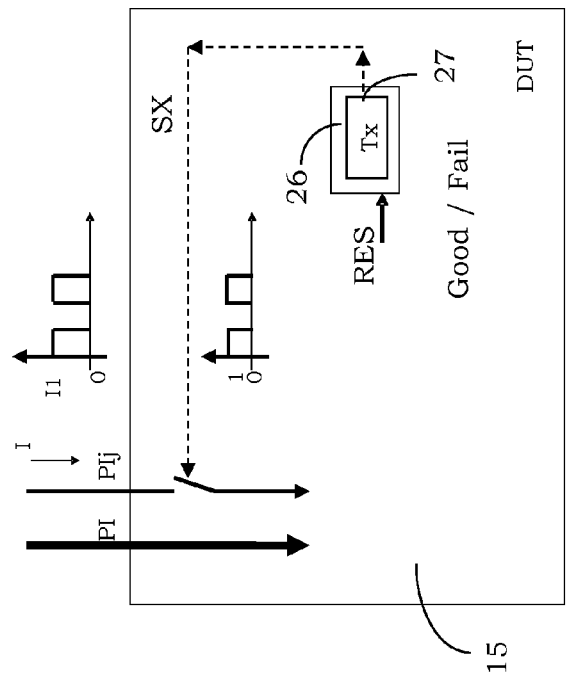

Alternatively, as schematically shown in FIG. 6D, the load modulation technique can be applied to at least one wired line PIj of the wireline transmission channel, by means of an additional load Clm on the wired line PIj, that varies the absorbed current I.

Then the at least one wired line PIj employed for transporting digital signals at the input of the device DUT 15 can be used for supplying information to the tester ATE 30, varying at least one of its electric parameters thanks to a suitable circuit.

Obviously, the hybrid implementations can be made with respect to those shown, together with the prior art without departing from the scope of protection.

So far digital circuits have been dealt with whose testing is executed through scan chains, but the method can extend to digital circuits like non-volatile or volatile memories using the relative techniques DFT.

Moreover, although by way of simplicity reference has been made to the testing of the digital circuits of the devices DUT, the same method can be applied also to non-digital circuits, for example analog circuits, RF, MEMS, or other, advantageously and possibly provided with suitable test circuits.

Figure 13:
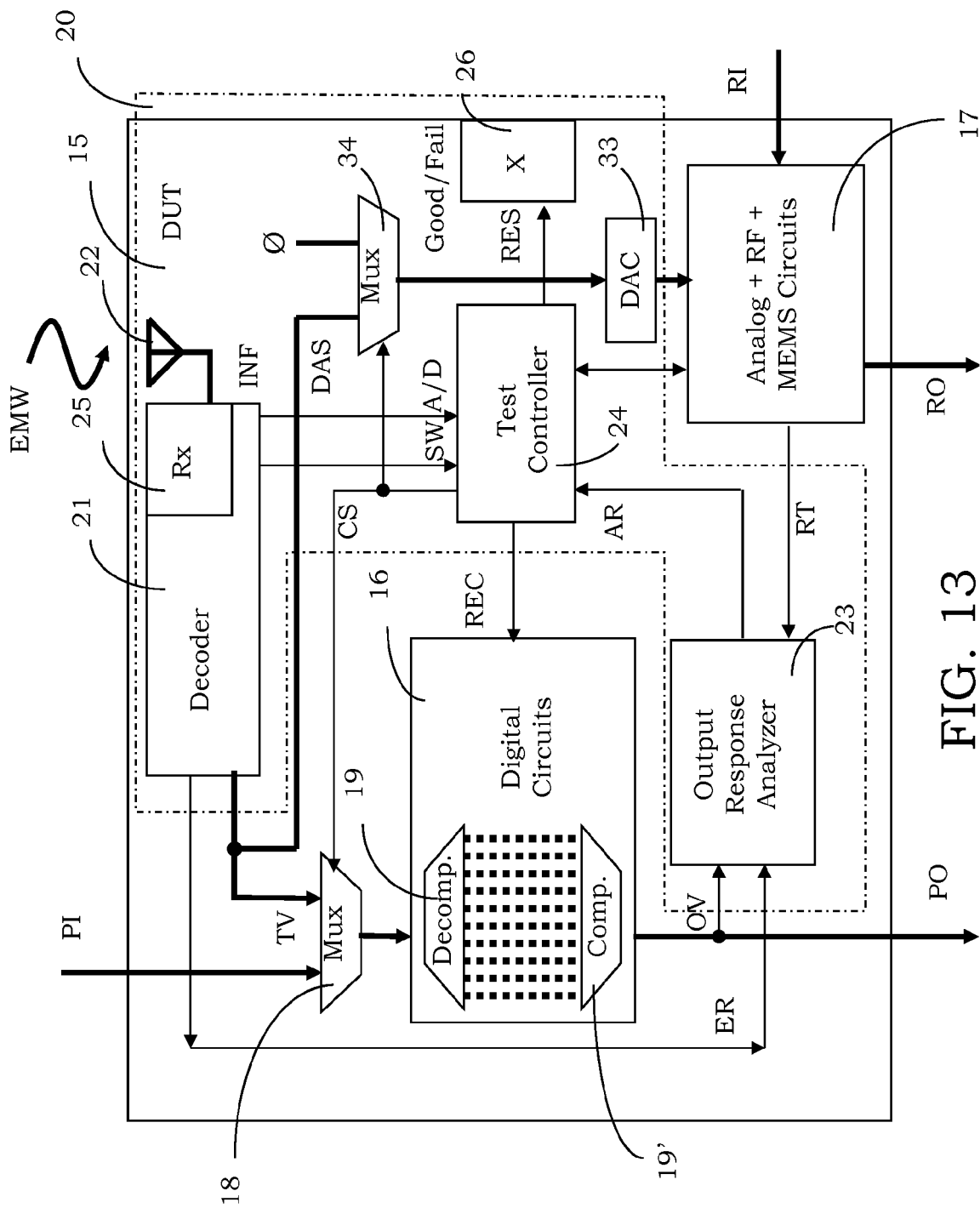

In this sense, considering the case in which the non-digital circuit 17 contains analog circuits, the same method can be applied, as shown in FIG. 13.

The stimuli at the input of the non-digital circuit 17 can be taken for example from the digital-analog conversion of digitalized signals DAS (Digitalized Analog Signals, in a certain sense equivalent to the test vectors TV), coming from the decoder block 21 and converted into analog form by a digital-analog conversion circuit DAC 33.

The same decoder block 21 will supply a signal A/D to the controller 24 for indicating if the test of the analog circuits or the test of the digital circuits is to be executed, so as to suitably arrange the test circuits, for example the signal CS will arrange the multiplexer 18 and a further multiplexer 34 so that the digitalized signals DAS do not go to the input of the digital circuit 16 but to the digital-analog conversion circuit DAC 33.

The non-digital circuit 17 can supply the test results RT in the digital form (for example after a suitable conversion into the digital form through a circuit of analog-digital conversion ADC, not shown in the Figure) that can be compared directly with the awaited response signal ER in the analyzer block 23.

Alternatively, in the analyzer block 23 at least one ADC (also not shown) can be present for allowing the comparison of the awaited response digital signal ER with the digital form of the analog signal in response for example to suitable stimuli at the inputs RI.

It is clear that the test flows shown are only indicative and non-limiting examples, since a generic test flow depends on the particular device DUT considered, and on the specifications requested by a final buyer of the same.

Naturally the receivers 25 and 29, the high speed serial interface 28, the circuit of digital-analogic conversion DAC 33 and the circuit of analogic-digital conversion ADC can be used also during the normal operation of the device DUT 15.

Furthermore, if the device DUT 15 has enough resources, for example of memory, besides saving the result Good/Fail, possibly also other information can be saved, such as for example the amount of tests that have produced result Fail or some details of some tests considered particularly significant, that will then have the possibility to be read during a successive standard test flow (such as the flow EWS2), for example with the aim of better identifying the critical wafers to be subsequently subjected to a further test flow (such as the flow EWS3) for the analysis/diagnosis of the problems. Similarly this can be done if circuits are available for the load modulation or circuits are available that vary an electric parameter of at least one wired line.

In conclusion, the testing method according to the disclosure, implemented by means of a testing architecture including at least one device DUT provided with an integrated testing circuit as above described and associated with a tester ATE, allows to realize a testing of at least part of this device DUT using only one-way signals from the tester ATE to the device DUT, substantially realizing a one-way test.

At least some embodiments of the testing method and testing architecture allow to attain several advantages among which:
  reducing the number of resources used by the tester ATE for the testing of at least one device DUT;
  possibly sharing these resources of test by at least two devices DUT, in general by a plurality of devices DUT;
  increasing the test parallelism, reducing its costs;
  reducing the transfer rate or baud rate between the tester ATE and the device DUT, since the communication occurs only from the tester ATE towards the device DUT itself, and the device DUT does not send any signal to the tester ATE;
  allowing a reading of information container in a device DUT by the tester ATE, the device DUT varying one electric/electromagnetic parameter thereof that is measured by the tester ATE.

In substance, the testing method according to the disclosure allows to simplify the testing architecture and in particular the integrated testing circuit 20 comprised in each device DUT.

All this is obtained, advantageously according to the disclosure, considering a wafer, or at least a part of it, as a system that is desired to be tested using at best the potentialities of the generic tester ATE available in a production environment. The testing architecture thus obtained is flexible and can be reduced, and can be applied for example in different circuit cores as in the dual core or multi-core architectures, and in addition can be inserted in circuit cores being contained in other circuit cores.

The method, being applicable to a device DUT, can be thus employed for the testing EWS and WLBI besides for the final testing FT and for the testing of the SiP, or other.

Obviously the skilled in the art will be allowed to introduce several modifications in the method and in the architecture above described, with the aim of meeting contingent and specific needs, all comprised within the scope of protection of the disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. A testing architecture, comprising:
  a tester; and
  a device associated with the tester and including:
    a circuit to be tested; and
    an integrated testing circuit coupled to the circuit to be tested, the integrated testing circuit including:
      an interface configured to receive from the tester an expected response signal corresponding to a condition of correct operation of said circuit a comparator configured to compare said expected response signal and an output response of said circuit; and a test controller configured to generate a result having a first value in case of correspondence between said output response with said expected response signal, and a second value in case of non-correspondence between said output response and said expected response signal, wherein said integrated testing circuit comprises a decompression module and a compression module configured to compress an output signature of said output response and send the compressed output signature to the comparator, which is configured to compare the compressed output signature with said expected response signal.

2. The testing architecture according to claim 1, wherein the interface comprises an input decoder, an antenna, and a receiver, the input decoder being coupled to the antenna through the receiver, and said tester comprises a transmitter and an antenna configured to provide a wireless communication channel between said device and said tester.

3. The testing architecture according to claim 1, comprising a wired communication channel coupled between said tester and said device and configured to transmit information to said device through electrical signals.

4. The testing architecture according to claim 1, wherein the interface comprises:
a decoder that includes a high speed serial interface; and
a high speed digital input terminal coupled to the high speed serial interface and configured to receive information for said device.

5. The testing architecture according to claim 1, wherein the interface comprises a receiver configured to receive radiofrequency signals.

6. The testing architecture according to claim 1, wherein said integrated testing circuit comprises a result block configured to receive said result information.

7. The testing architecture according to claim 6, wherein said result block comprises at least one among:
a non-volatile memory element configured to store said result information;
a non-volatile FAMOS memory;
a fuse link;
an anti-fuse link;
a transmitter configured to communicate with a receiver of said interface and employ load modulation;
a transmitter coupled to the interface by a wireline and configured to employ a communication technique that varies an electric parameter of said wireline.

8. The testing architecture according to claim 1, wherein the device is one of a plurality of devices configured to communicate with said tester.

9. The testing architecture according to claim 1, wherein said circuit to be tested comprises one or more among:
digital circuits;
analog circuits;
RF circuits; and
MEMS circuits.

10. The testing architecture according to claim 1, wherein:
the device includes an analog circuit and a digital circuit that are electrically coupled to the integrated testing circuit, and the circuit to be tested is one of the analog circuit and digital circuit;
the interface is configured to receive from the tester the expected response signal corresponding to a condition of correct operation of one of said analog and digital circuits, provide a selection signal that selects one of the analog and digital circuits is to be tested, and provide a testing signal;
the device includes a selection circuit configured to provide the testing signal to the selected one of the analog and digital circuits; and
the comparator is configured to compare said expected response signal and the output response of said circuit.

11. A device configured to communicatively coupled with a tester, comprising:
a circuit to be tested;
an integrated testing circuit coupled to the circuit to be tested, the integrated testing circuit including:
an interface configured to receive from the tester an expected response signal corresponding to a condition of correct operation of said circuit;
a comparator configured to compare said expected response signal and an output response of said circuit; and
a test controller configured to generate a result information having a first value in case of correspondence between said output response with said expected response signal, and a second value in case of non-correspondence between said output response and said expected response signal, wherein said integrated testing circuit comprises a compression module configured to compress an output signature of said output response and send the compressed output signature to the comparator, which is configured to compare the compressed output signature with said expected response signal.

12. The device according to claim 11, wherein the interface comprises an input decoder, an antenna, and a receiver, the input decoder being coupled to the antenna through the receiver, said interface being configured to wirelessly receive information from the tester.

13. The device according to claim 11, wherein the interface is configured to receive information from the tester via a wired communication channel.

14. The device according to claim 11, wherein the interface comprises:
a decoder that includes a high speed serial interface; and
a high speed digital input terminal coupled to the high speed serial interface and configured to receive information from the tester.

15. The device according to claim 11, wherein the interface comprises a receiver configured to receive radiofrequency signals.

16. The device according to claim 11, wherein said integrated testing circuit comprises a storage device configured to store said result information.

17. The device according to claim 11, wherein:
the device includes an analog circuit and a digital circuit that are electrically coupled to the integrated testing circuit, and the circuit to be tested is one of the analog circuit and digital circuit;
the interface is configured to receive from the tester the expected response signal corresponding to a condition of correct operation of one of said analog and digital circuits, provide a selection signal that selects one of the analog and digital circuits is to be tested, and provide a testing signal;
the device includes a selection circuit configured to provide the testing signal to the selected one of the analog and digital circuits; and
the comparator is configured to compare said expected response signal and the output response of said circuit.

* * * * *

UNITED STATES PATENT AND TRADEMARK OFFICE
CERTIFICATE OF CORRECTION

PATENT NO. : 8,829,931 B2  
APPLICATION NO. : 13/252895  
DATED : September 9, 2014  
INVENTOR(S) : Alberto Pagani et al.

Page 1 of 1

It is certified that error appears in the above-identified patent and that said Letters Patent is hereby corrected as shown below:

Title Page Item (73):
"STMircoelectronics (Grenoble 2) SAS, Grenoble (FR); STMircoelectronics S.r.l., Agrate Brianza (IT)" should read, --STMicroelectronics (Grenoble 2) SAS, Grenoble (FR); STMicroelectronics S.r.l., Agrate Brianza (IT)--.

Signed and Sealed this  
Seventeenth Day of March, 2015

Michelle K. Lee  
*Director of the United States Patent and Trademark Office*